(12) United States Patent
Humphreys et al.

(10) Patent No.: US 8,775,598 B2
(45) Date of Patent: Jul. 8, 2014

(54) INTELLIGENT OFFLINE CACHING OF NON-NAVIGATED CONTENT BASED ON USAGE METRICS

(75) Inventors: Andrew David Humphreys, Emsworth (GB); John James Peter McNamara, Winchester (GB); John Donald Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/481,174

(22) Filed: May 25, 2012

(65) Prior Publication Data

US 2013/0007205 A1   Jan. 3, 2013

Related U.S. Application Data

(63) Continuation of application No. 13/172,353, filed on Jun. 29, 2011.

(51) Int. Cl.
*G06F 15/173* (2006.01)
(52) U.S. Cl.
USPC .......................................................... 709/223
(58) Field of Classification Search
USPC .......................................................... 709/223
See application file for complete search history.

(56) References Cited

U.S. PATENT DOCUMENTS

| | | | |
|---|---|---|---|
| 7,814,234 B2 | 10/2010 | Hawkins et al. | |
| 2004/0012625 A1* | 1/2004 | Lei et al. | 345/738 |
| 2004/0210433 A1 | 10/2004 | Elazar et al. | |
| 2007/0124693 A1* | 5/2007 | Dominowska et al. | 715/772 |
| 2008/0005657 A1 | 1/2008 | Sneh | |
| 2009/0006308 A1* | 1/2009 | Fonsen | 707/1 |
| 2009/0063590 A1* | 3/2009 | Yuval et al. | 707/205 |
| 2011/0181616 A1* | 7/2011 | Sayers et al. | 345/619 |

* cited by examiner

*Primary Examiner* — Azizul Choudhury
*Assistant Examiner* — James Forman
(74) *Attorney, Agent, or Firm* — Patents on Demand P.A.; Brian K. Buchheit; Scott M. Garrett

(57) ABSTRACT

A request for a navigated content associated with a browsing session can be received. The navigated content can be an electronic artifact which can be presented within an interface during the browsing session. The navigated content can be associated with a data source. The interface can be associated with a computing device. A usage metric associated with the navigated content can be collected. The usage metric can be a frequency and/or a duration measurement. The usage metric can be determined to be equivalent to a threshold value of a usage ruleset and can automatically persist within an offline cache the navigated content. A non-navigated content within the offline cache can be programmatically stored. The non-navigated content can be an electronic artifact linked to the navigated content wherein the non-navigated content is not presented within the interface during the browsing session.

9 Claims, 3 Drawing Sheets

INTELLIGENT OFFLINE CACHING OF NON-NAVIGATED CONTENT BASED ON USAGE METRICS

CROSS-REFERENCE TO RELATED APPLICATIONS

This application is a continuation of U.S. patent application Ser. No. 13/172,353, filed Jun. 29, 2011 (pending), which is incorporated herein in its entirety.

BACKGROUND

The present invention relates to the field of browsing and, more particularly, to intelligent offline caching of non-navigated content based on usage metrics.

Mobile workers such as consultants and/or sales teams can be frequently required to work in environments where network connectivity is limited. For example, consultants often work on engagements which involve access to sensitive data and therefore security prohibits Internet access. In these instances, the worker can be subject to severe information access restrictions. That is, access to resources such as product sites, information articles, and online reference material can be unavailable. Consequently, the worker ability can be hindered which can result in worker frustration and decreased productivity.

Current solutions to address these limitations require the worker to manually select certain resources (e.g., Web sites, Web pages) that are relevant to the worker. The worker must then enable offline access to the resources. That is, the worker must recognize useful resources prior to limited connectivity scenarios. In many instances, important resources (e.g., Web sites) can be overlooked and not stored for offline access. For example, a worker can often forget to enable offline access for critical Web pages visited several days ago. Further, the current solution requires specific knowledge of relevant resources which can be unknown to the worker.

BRIEF SUMMARY

One aspect of the present invention can include a system, an apparatus, a computer program product, and a method for intelligent offline caching of non-navigated content based on usage metrics. A request for a navigated content associated with a browsing session can be received. The navigated content can be an electronic artifact which can be presented within an interface during the browsing session. The navigated content can be associated with a data source. The interface can be associated with a computing device. A usage metric associated with the navigated content can be collected. The usage metric can be a frequency and/or a duration measurement. The usage metric can be determined to be equivalent to a threshold value of a usage ruleset and can automatically persist within an offline cache the navigated content. A non-navigated content within the offline cache can be programmatically stored. The non-navigated content can be an electronic artifact linked to the navigated content wherein the non-navigated content is not presented within the interface during the browsing session Another aspect of the present invention can include an apparatus, a computer program product, a method and a system for intelligent offline caching of non-navigated content based on usage metrics. A caching engine can be able to determine relevant navigated and non-navigated content within a browsing session. The browsing session can be an online browsing session and an offline browsing session. A data store can be capable of persisting a usage ruleset, a navigated content, and a non-navigated content. The navigated content and non-navigated content can be an electronic artifact. The usage ruleset can be a threshold value and a caching action.

DETAILED DESCRIPTION

Figure 1:
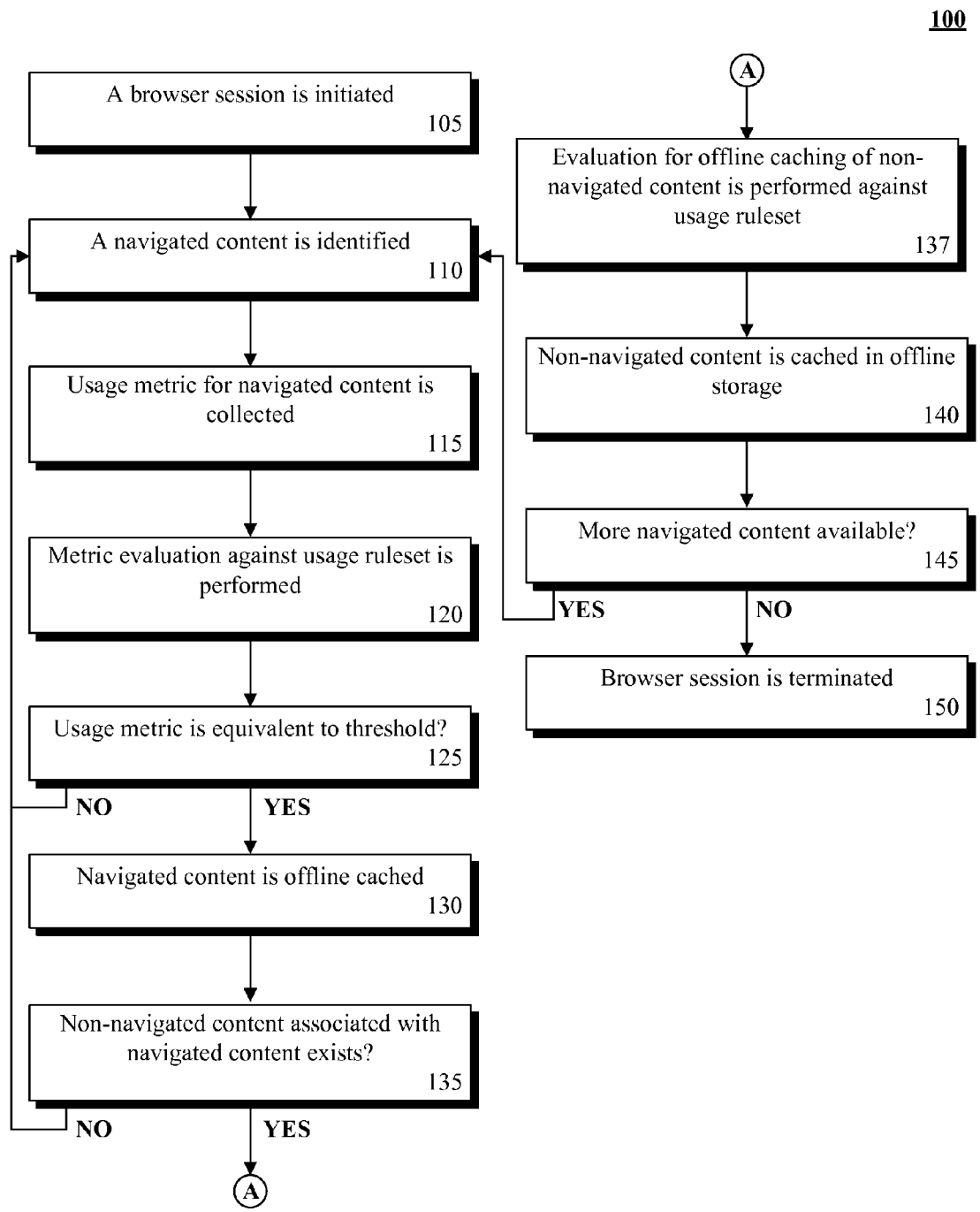
FIG. 1 is a schematic diagram illustrating a method for intelligent offline caching of non-navigated content based on usage metrics in accordance with an embodiment of the inventive arrangements disclosed herein.

The present disclosure is a solution for intelligent offline caching of non-navigated content based on usage metrics. In the solution, usage patterns within a browsing session can be monitored to determine resources (e.g., content) which can be relevant to a user. For example, Web browsing behavior can be analyzed to determine Web pages of importance to a user based on frequency of visits. When usage patterns match a usage rule of a usage ruleset, offline caching of the resource can be performed. It should be appreciated that the solution can enable offline caching of navigated content and non-navigated content. Navigated content can be content which can be manually requested and presented during a browsing session. Non-navigated content can be content which is not presented during the browsing session but linked to the navigated content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a method 100 for intelligent offline caching of online content based on usage metrics in accordance with an embodiment of the inventive arrangements disclosed herein. Method 100 can be present in the context of system 200 and/or interface 305. In method 100, usage behavior from a browser session can be utilized to persist relevant content in an offline cache. For example, a user can navigate to a Web page several times during a browsing session. The browser session can be associated with an interface (e.g., Web browser) of a computing device (e.g., laptop). Usage metrics can be collected during the browser session and evaluated against a usage ruleset to determine navigated and non-navigated content of interest. For instance, the number of visits to a Web page can be compared against a threshold value to ascertain the content relevance. Based on the ruleset evaluation, a caching action can be performed.

The caching action can persist navigated content and non-navigated content. The cached content can be retrieved and/or presented within an interface during an offline session. An offline session can be a browser session of a computing device having limited and/or no connectivity to a data source associated with the navigated and/or non-navigated content. For example, when a computing device lacks network access to the Internet, an offline session can be established to browse intelligently cached content within an offline cache.

As used herein, navigated content can be content presented within an interface during the browser session. Non-navigated content can be content associated with the navigated content but not presented within the interface during the browsing session. Navigated and/or non-navigated content can include dynamic and/or static content. For example, non-navigated content can be an ADOBE FLASH application embedded within a Web page. Method 100 can be performed in real-time and/or near real-time.

In step 105, a browser session can be initiated. The browser session can include, but is not limited to, Web browsing session, a co-browsing session, a Web conference session, and a desktop sharing session. The browser session can be automatically and/or manually initiated. For example, the browser session can be established when a Web browser application is executed. In step 110, a navigated content is identified. Navigated content can be identified through traditional and/or proprietary mechanisms including, but not limited to, an automatic navigation action, a manual navigation action, and the like. In one instance, the navigated content can be determined from a manually initiated navigation action. For example, a user can navigate to a content utilizing a Uniform Resource Locator (URL) inputted within a Web browser address bar.

In step 115, usage metric for navigated content can be collected. Usage metrics can include a frequency measurement, duration metrics, and the like. For instance, the duration a user browses a Web page can be collected to determine the likelihood a user is interested in the navigated content. In step 120, a usage metric evaluation can be performed against a usage ruleset to determine content relevance. Evaluation can conform to traditional and/or proprietary metric analysis and/or evaluation protocols. In one embodiment, usage metrics can be evaluated against one or more values within a usage ruleset. For example, a usage rule can be created to automatically cache non-navigated content associated with a Web page that a user has visited more than five times.

In step 125, if the usage metric is equivalent to threshold value, the method can continue to step 130, else return to step 110. The threshold value can be a single value, multiple values, and the like. It should be understood that the threshold value can be arbitrarily complex permitting sophisticated content relevance determination to be achieved. In step 130, the navigated content can be offline cached. The navigated content can be offline cached in one or more traditional and/or proprietary models. For example, the navigated content can be stored within a browser cache.

In step 135, if a non-navigated content associated with the navigated content exists, the method can continue to step 137, else return to step 110. In step 137, an evaluation for offline caching of non-navigated content is performed against the usage ruleset. The evaluation can be similar and/or dissimilar to the navigated content evaluation in step 125. In one instance, keyword data can be analyzed to determine the expected relevance of non-navigated content. In the instance, when a keyword frequency is equivalent to a frequency value, the non-navigated content can be automatically cached. In one embodiment, non-navigated content can be automatically cached without being evaluated via a ruleset.

In step 140, the non-navigated content can be cached in an offline storage. The non-navigated content can be linked to the navigated content enabling seamless browsing through navigated and non-navigated content during an offline session. The offline storage can be a storage component associated a computing device. That is, when computing device is not communicatively linked to a source associated with navigated content, navigated and non-navigated content can be transparently retrieved from the offline cache and presented within an interface. In step 145, if more navigated content is available, the method can return to step 110, else continue to step 150. In step 150, the browser session can be terminated and the method can end.

Drawings presented herein are for illustrative purposes only and should not be construed to limit the invention in any regard. It should be appreciated the method 100 can be performed continuously during a browser session. That is, content can be transparently persisted during user browsing actions (e.g., selecting a hyperlink). The method can be performed in parallel, in serial, and the like. It should be understood that method 100 can be interactive or non-interactive based on one or more configuration options.

In one instance, one or more portions of a content can be automatically persisted offline. For example, when a user interacts with a portion of navigated content, the navigated content and associated non-navigated content can be automatically persisted offline utilizing method 100. In another instance, method 100 can be triggered via one or more user interface actions. In the instance, a copy/paste action can trigger steps 130-145 to be transparently performed. In yet another instance, method 100 can be performed upon a browser bookmark. For example, Web browser bookmarks can be automatically parsed and relevant non-navigated content can be offline cached.

Figure 2:
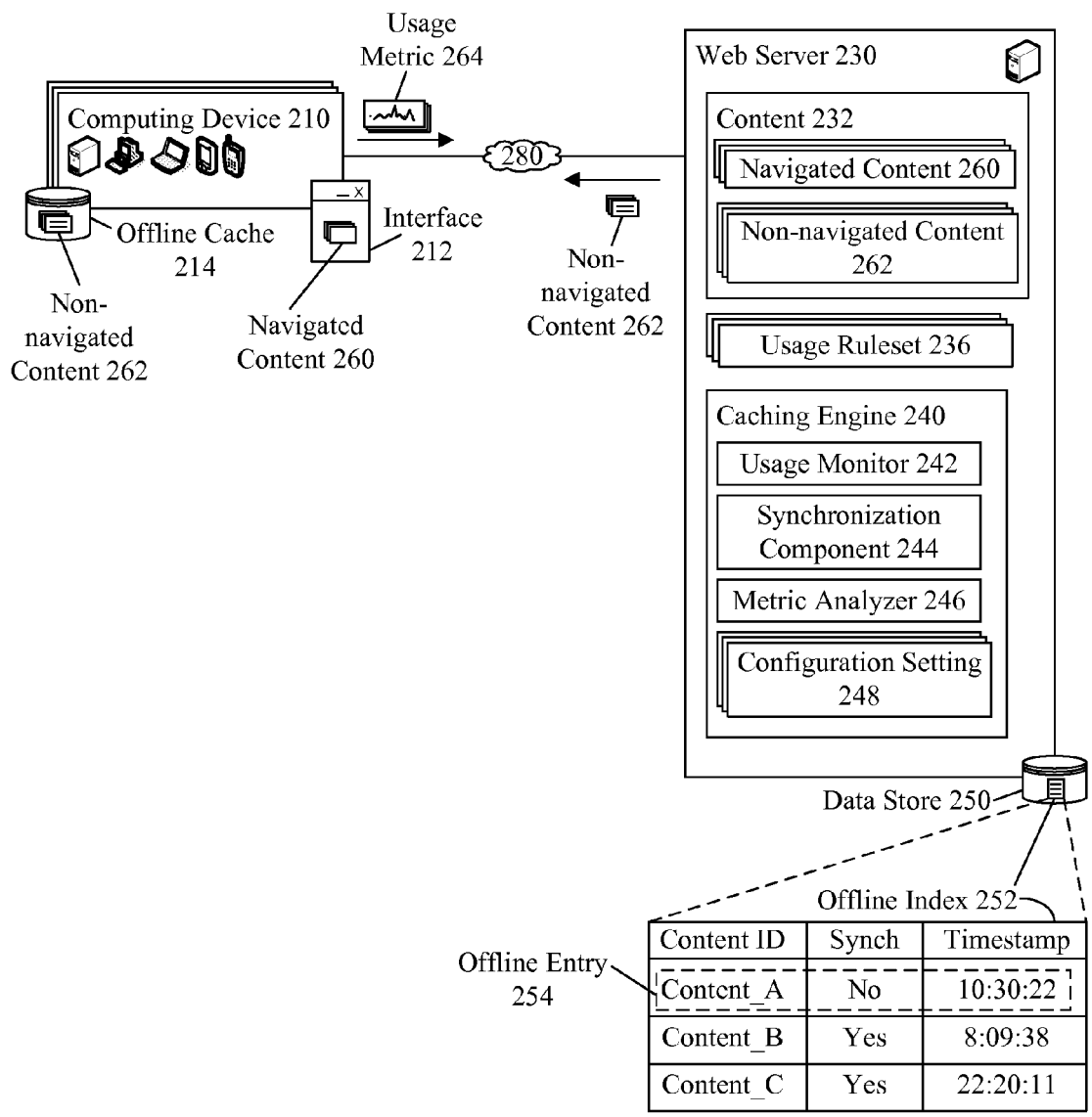
FIG. 2 is a schematic diagram illustrating a system for intelligent offline caching of non-navigated content based on usage metrics in accordance with an embodiment of the inventive arrangements disclosed herein.

FIG. 2 is a schematic diagram illustrating a system 200 for intelligent offline caching of non-navigated content based on usage metrics in accordance with an embodiment of the inventive arrangements disclosed herein. System 200 can be present in the context of method 100 and/or interface 305. In system 200, a caching engine 240 can permit the automated offline caching of content 232 based on usage patterns. That is, navigated content 260 and non-navigated content 262 can be stored within offline cache based on navigated content 260 metrics. In one embodiment, engine 240 can be a component of Web server 230. In the embodiment, engine 240 can be a functionality of a Hypertext Transport Protocol (HTTP) engine. In another embodiment, engine 240 can be an element of an interface 212 associated with device 210. In the embodiment, engine 240 can be a functionality of a Web browser executing within device 210.

It should be appreciated that engine 240 can be a networked element of a computing environment. That is, in system 200, engine 240 can be communicatively linked with server 230 and can be independent of server 230. Engine 240 can be a component of a distributed computing system, networked computing system, and the like. In one embodiment, engine 240 can reside within device 210. In the embodiment, engine 240 can be a locally executing offline caching service (e.g., caching proxy) able to intelligently cache navigated 260 and non-navigated content 262.

System 200 can represent one embodiment enabling the heuristic offline caching of user relevant content utilizing usage metrics. System 200 can include, but is not limited to, computing device 210, Web server 230, network 280, and the like. System 200 can be communicatively linked via network 280. System 200 configuration can vary based on implementation details, component abilities, component limitations, and the like. In one instance, system 200 can be a "drop-in" solution able to extend an existing infrastructure. For example, system 200 functionality can be a feature of a Web browser plug-in. In another instance, system 200 can be a functionality of an application programming interface (API).

It should be appreciated that system 200 can illustrate an online state and an offline state. An online state can include computing device 210 communicatively linked to server 230 and/or content 232. During the online state, navigated content 260 can be communicated and presented within interface 212. An online state can be associated with a traditional online browsing session. Usage metrics 262 collected from content 260 during the online state can be communicated to engine 240. An offline state can include computing device 210 lacking a communicative link to server 230 and/or content 232. For example, an offline state can include a scenario where a low bandwidth connection is inadequate to retrieve content 232 within a suitable time frame. An offline state can be associated with a traditional offline browsing session. In an offline state, usage metrics 264 can be continually collected and can be communicated during an online state, enabling cache 214 contents to evolve based on user behavior.

In one instance, the system 200 can perform during a partial and/or complete communication failure. For example, when a network connection fails, offline cache 214 can be automatically utilized to retrieve and present navigated content 260 and non-navigated content 262.

Web server 230 can be a hardware/software component for conveying a content 232 to a computing device 210. Server 230 can include, but is not limited to, content 232, usage metric 264, usage ruleset 236, caching engine 240, data store 250, and the like. Web server 230 can include traditional and/or proprietary Web server technologies and/or functionality. For example, server 230 can be an APACHE HTTP Web server. In one instance, server 230 can be an IBM WEBSPHERE server.

Content 232 can be an electronic artifact associated with a content provider (e.g., server 230). Content 232 can include, but is not limited to, a document, a Web page, an application, an image, a video stream, and the like. Content 232 can conform to traditional and/or proprietary formats including, but not limited to, Hypertext Markup Language (HTML), Extensible Markup Language (XML), and the like. Content 232 can include navigated content 260 and non-navigated content 262. Navigated content 260 can include content presented within interface 212 resulting from a navigation action. Non-navigated content 262 can be associated with navigated content 260 and can be presented within interface 212 during an offline state. For instance, non-navigated content 262 can be stored within offline cache 214 during an online state and presented during an offline state within an offline browser session.

Usage metric 264 can be one or more measurements indicating a usage pattern associated with a content 232. Usage metric 264 can include, but is not limited to, browsing duration, browsing frequency, click path, and the like. For instance, metric 264 can include metrics such as hits, page views, visits, bounce rates, and the like. In one embodiment, usage metric 264 can include traditional Web analytic information, including, but not limited to, click analytics, lifecycle analytics and the like. Metric 264 can conform to traditional and/or proprietary formats. In one embodiment, metric 264 can be encrypted during communication from device 210 to engine 240 and decrypted upon analysis. It should be appreciated that metric 264 can be communicated during an online browsing session and/or an offline browsing session.

Usage ruleset 236 can be one or more rules for performing intelligent offline caching based on usage metric 264. Ruleset 236 can include, but is not limited to, an identifier, a name, a threshold value, a caching action, an owner, an expiration value, and the like. In one embodiment, ruleset 236 can include a threshold value which can be compared to one or more usage metrics 264. Ruleset 236 can be automatically and/or manually established. In one instance, ruleset 236 can be heuristically generated based on historic rulesets, rulesets associated with different owners, and the like. Ruleset 236 can be stored within engine 240, data store 250, cache 214, and the like.

Caching engine 240 can be a hardware/software component for performing usage metric driven offline content caching. Engine 240 can include, but is not limited to, usage monitor 242, synchronization component 244, metric analyzer 246, and the like. Engine 240 functionality can include, but is not limited to, browsing usage analysis, metric collection, content synchronization, and the like. In one instance, engine 240 can be a component of content management system. It should be appreciated that engine 240 can operate during an online and offline browsing session. It should be appreciated that, engine 240 components can be distributed throughout one or more components of system 200.

Usage monitor 242 can be a hardware/software entity for collecting usage behavior during a browsing session. Usage metrics 234 can be obtained utilizing traditional and/or proprietary mechanisms. In one instance, monitor 242 can track user input device data to determine relevant content. In the instance, monitor 242 can detect special browser events initiated by a user action. For example, monitor 242 can detect a rollover event to determine interaction with a content. In another instance, user input can be utilized to identify non-navigated content 262 of interest. For example, keyboard input can be utilized to identify keywords which can be employed to persist non-navigated content 262. In one instance, usage metrics 234 can be collected during an offline browsing session. In the instance, metrics 234 can be analyzed to determine relevant content which can be automatically synchronized to the offline cache 214.

Metric analyzer 246 can be a hardware/software element able to evaluate usage metric 264 to determine relevant content 232. Analyzer 246 can utilize traditional and/or proprietary analysis protocols. In one instance, analyzer 246 can process metric 264 and evaluate results against metric ruleset 236. In the instance, analyzer 246 can assess metric results against one or more threshold values within ruleset 236. For example, analyzer can evaluate a frequency metric against a rule within ruleset 236. Based on analyzer 234 evaluation, a caching action can be executed. For example, when a metric is greater than a threshold value within ruleset 236, non-navigated content 262 can be offline cached.

Synchronization component 244 is a hardware/software element for persisting navigated content 260 and/or non-navigated content 262 within offline cache 214. Component 244 can utilize traditional and/or proprietary mechanisms to synchronize content within offline cache 214. For example, Asynchronous JavaScript and Extensible Markup Language (AJAX) methods can be employed to update cache 214 in real-time. In one instance, component 244 can update cache 214 via delta encoding. In the instance, a delta can be identified and communicated to synchronize content 260, 262. In one embodiment, offline index 252 can be maintained by component 244 to enable real-time content synchronicity. In the embodiment, synchronization state of content 232 can be tracked in real-time utilizing an offline entry 254. In one embodiment, component can permit synchronization across multiple computing devices. For example, browsing content on a mobile phone can trigger non-navigated content 262 to be cached within an offline cache 214 of a laptop. In one embodiment, component 244 can be an external tool communicatively linked to engine 240. For example, component 244 can be a WGET utility able to recursively download Web-based content.

Configuration setting 248 can be one or more options for establishing the behavior of system 200 and/or engine 240. Setting 248 can include, but is not limited to, content 232 settings, usage monitor 242 options, synchronization component 244 parameters, metric analyzer 246 settings, offline index 252 options, and the like. Setting 248 can be utilized to configure update frequency, metric analysis algorithms, encryption, privacy settings, and the like. In one instance, setting 248 can be configured through interface 212.

Offline index 252 can be a dataset for managing content 232 synchronization with offline cache 214. Index 252 can include, but is not limited to, a content identifier, a synchronization state, a timestamp, an expiration value, a computing device identifier, and the like. Offline index 252 can be stored within data store 250, offline cache 214, and the like. In one instance, index 252 can be a portion of a database table residing within a database. In another instance, index 252 can be a data file stored within offline cache 214. It should be appreciated that offline index 252 can be an optional entity.

Computing device 210 can be a hardware/software entity for executing a browsing session within an interface 212. Device 210 can include, but is not limited to a desktop computer, a laptop computer, a tablet computing device, a portable media player, a portable digital assistant (PDA), a mobile phone, and the like. Device 210 can be communicatively linked to offline cache 214, interface 212, and the like. Device 210 can include multiple computing devices 210, multiple interfaces 212, multiple offline caches 214, and the like. That is, system 200 can be utilized to intelligently persist navigated content 260 and/or non-navigated content 262 across multiple system and/or components.

Interface 212 can be a hardware/software element for performing user interface actions within a browsing session. Interface 212 functionality can include, but is not limited to, content 232 presentation, configuration management, and the like. In one instance, interface 212 can be a Web browser including, but not limited to, MOZILLA FIREFOX, APPLE SAFARI, KONQUEROR, GOOGLE CHROME, and the like. Interface 212 can be a graphical user interface able to present navigated content 260 and non-navigated content 262 during an offline browser session.

Offline cache 214 can be a data store able to persist navigated and non-navigated content 262. Cache 214 can conform to traditional and/or non-traditional data storage formats. Cache 214 can include, but is not limited to, random access memory (RAM), read-only memory (ROM), flash memory, and the like. In one embodiment, cache 214 can be associated with a browser cache. In another embodiment, cache 214 can be independent of a browser cache and/or device 210. For example, offline cache 214 can be a removable storage device such as a flash memory drive.

Data store 250 can be a hardware/software component able to store unscheduled list 232. Data store 250 can be a Storage Area Network (SAN), Network Attached Storage (NAS), and the like. Data store 250 can conform to a relational database management system (RDBMS), object oriented database management system (OODBMS), and the like. Data store 250 can be communicatively linked to server 230 in one or more traditional and/or proprietary mechanisms.

Network 280 can be an electrical and/or computer network connecting one or more system 200 components. Network 280 can include, but is not limited to, twisted pair cabling, optical fiber, coaxial cable, and the like. Network 280 can include any combination of wired and/or wireless components. Network 280 topologies can include, but is not limited to, bus, star, mesh, and the like. Network 280 types can include, but is not limited to, Local Area Network (LAN), Wide Area Network (WAN), Virtual Private Network (VPN) and the like.

Drawings presented herein are for illustrative purposes only and should not be construed to limit the invention in any regard. System 200 functionality can extend to traditional and non-traditional content and/or resources including, but not limited to, social networking sites (e.g., user profile pages), files, directory structures, and the like. For example, system 200 can cache a File Transfer Protocol (FTP) directory structure associated with a user home directory. In one embodiment, system 200 can include partial minoring of Web sites, permitting seamless navigation of content during an offline state. In one instance, the system 200 can be configured to persist only non-navigated content 262.

Figure 3:
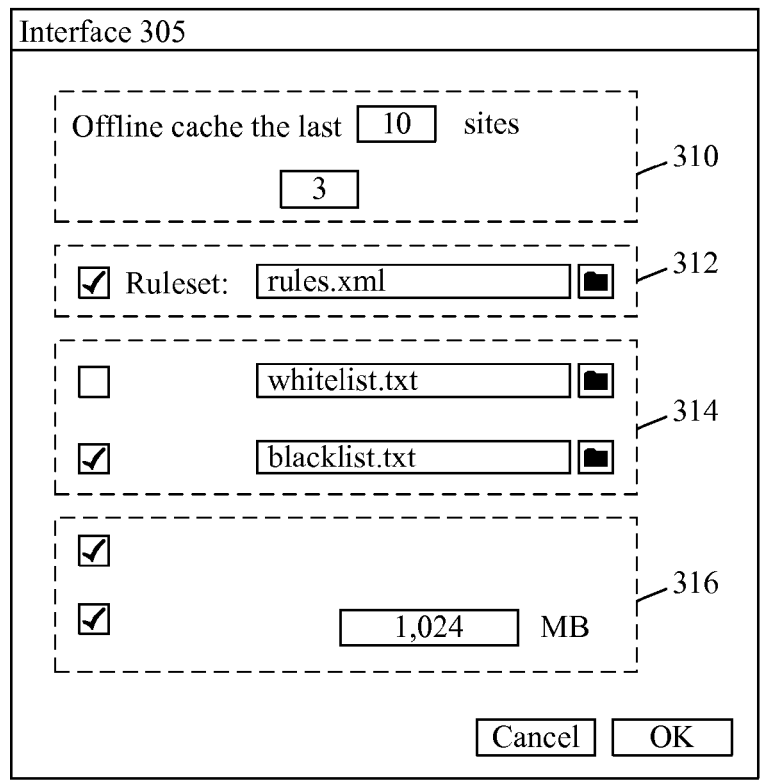
FIG. 3 is a schematic diagram illustrating an interface for intelligent offline caching of non-navigated content based on usage metrics in accordance with an embodiment of the inventive arrangements disclosed herein.

FIG. 3 is a schematic diagram illustrating an interface 305 for intelligent offline caching of online content based on usage metrics in accordance with an embodiment of the inventive arrangements disclosed herein. Interface 305 can be present in the context of method 100 and/or system 200. In interface 305, offline caching configuration options 310-316 can be presented and/or configured. In one instance, configuration options 310-316 can be a screen of a configuration process. For instance, interface 305 can be a screen of a configuration wizard. Interface 305 can be associated with a client browsing interface, server configuration interface, and the like. In one instance, interface 305 can be associated with system 200 (e.g., interface 212). Interface 305 can include but is not limited to, offline caching options 310, ruleset parameters 312, filtering options 314, cache configuration parameters 316, and the like. In offline caching options 310, automated caching based on usage parameters can be configured. In one instance, options 310 can include persisting historically browsed content. For example, a user can specify the last ten visited Web sites can be automatically cached. In another instance, options 310 can include caching depth parameters enabling flexible offline content storage. For example, offline caching can be limited to three hyperlinks in depth.

In ruleset parameter 312, one or more rulesets can be utilized to extend offline caching functionality and/or usage pattern triggers. In parameter 312, an external ruleset file can be specified. For example, a file selection dialog can be presented enabling selection of one or more rulesets residing within a computing device. In one instance, the ruleset can conform to an Extensible Markup Language format. In another instance, the ruleset can conform to a flat text file.

In filtering options 314, one or more filtering lists can be specified. In options 314, a whitelist and/or a blacklist can be selected. Filtering lists within option 314 can conform to traditional and/or proprietary formats. In one embodiment, whitelist and blacklist can be a plain text formatted file. In one instance, selection of filtering lists can be enabled or disabled through a check box interface element.

In cache configuration parameters 316, cache administration options can be presented and/or manipulated. In one instance, parameters can include revision options, cache size settings, and the like. In one embodiment, the disclosure can be configured to store multiple revisions of a content within an offline cache. In the embodiment, a revision option can be easily enabled or disabled via a check box interface element. In one embodiment, cache size can be configured within parameters 316. Cache size can be automatically determined and/or manually specified. In one instance, cache size can be limited to a quantity of megabytes. For instance, a user can specify the cache not to exceed one gigabyte in size.

Drawings presented herein are for illustrative purposes only and should not be construed to limit the invention in any regard. Interface 305 can include, but is not limited to, a graphical user interface (GUI), voice user interface (VUI), mixed-mode interface, text-based interface, and the like. It should be appreciated that interface 305 can include additional options for specifying caching behavior, content presentation, and the like. Configuration options 310-316 can be associated with a file menu, context menu, and the like. Interface 305 can include graphical user interface elements including, but not limited to, input boxes, check boxes, radio dialogs, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for usage-based offline caching comprising:
a Web server, comprising one or more processors, one or more non-transitory storage mediums, and program instructions stored in the one or more non-transitory storage mediums, the one or more processors executing the program instructions, wherein the Web server is a component of an IBM WEBSPHERE middleware platform, receiving a request for a navigated content associated with a browsing session, wherein the navigated content is an electronic artifact, wherein the navigated content is presented within an interface during the browsing session, wherein the navigated content is associated with at least one data source, wherein the interface is associated with a computing device;

the Web server collecting a usage metric associated with the navigated content, wherein the usage metric is at least one of a frequency and a duration measurement;

the Web server determining the usage metric is equivalent to a threshold value of a usage ruleset and automatically persisting within an offline cache the navigated content; and the Web server programmatically storing a non-navigated content within the offline cache, wherein the non-navigated content is an electronic artifact linked to the navigated content wherein the non-navigated content is not presented within the interface during the browsing session.

2. The method of claim 1, wherein the electronic artifact is at least one of a document, a Web page, an application, an image, and a video stream.

3. The method of claim 1, wherein the browsing session is at least one of a Web browsing session, a co-browsing session, a Web conference session, and a desktop sharing session.

4. The method of claim 1, wherein the usage ruleset is associated with at least one of a whitelist and a blacklist.

5. The method of claim 1, further comprising:
presenting at least one of the navigated content and the non-navigated content within an interface during an offline session, wherein the offline session is a browsing session during an interval when the computing device is not communicatively linked to the at least one data source.

6. The method of claim 1, further comprising:
automatically synchronizing the at least one of the navigated content and the non-navigated content, wherein a delta associated with the navigated content and the non-navigated content within the at least one data store is programmatically propagated to the offline cache during a browsing session.

7. The method of claim 1, wherein the claimed method is associated with a Web-based proxy.

8. The method of claim 1, wherein the non-navigated content is persisted within an offline cache associated with a plurality of computing devices.

9. The method of claim 1, wherein the usage metric is a Web analytic measurement.

* * * * *